(12) United States Patent
Broden et al.

(10) Patent No.: US 9,857,259 B2
(45) Date of Patent: Jan. 2, 2018

(54) DIFFERENTIAL PRESSURE SENSOR WITH HIGH PRESSURE CAPABILITIES

(71) Applicant: Rosemount Inc., Chanhassen, MN (US)

(72) Inventors: David Andrew Broden, Andover, MN (US); Charles Ray Willcox, Chanhassen, MN (US); Donald Edward Harasyn, Eden Prairie, MN (US)

(73) Assignee: Rosemount Inc., Shakopee, MN (US)

( * ) Notice: Subject to any disclaimer, the term of this patent is extended or adjusted under 35 U.S.C. 154(b) by 78 days.

(21) Appl. No.: 14/501,310

(22) Filed: Sep. 30, 2014

(65) Prior Publication Data

US 2016/0091379 A1    Mar. 31, 2016

(51) Int. Cl.
  *G01L 9/00*    (2006.01)
  *G01L 11/02*    (2006.01)
  *G01L 19/06*    (2006.01)

(52) U.S. Cl.
  CPC .......... *G01L 9/0075* (2013.01); *G01L 11/025* (2013.01); *G01L 19/0681* (2013.01)

(58) Field of Classification Search
  CPC ... G01L 13/025; G01L 9/0073; G01L 9/0072; G01L 9/12; G01L 13/026
  See application file for complete search history.

(56) References Cited

U.S. PATENT DOCUMENTS

| | | | |
|---|---|---|---|
| 4,370,890 A | 2/1983 | Frick | |
| 4,388,833 A | 6/1983 | Kuwayama | |
| 4,520,675 A | 6/1985 | Ziegler | |
| 4,612,812 A | 9/1986 | Broden | |
| 5,760,310 A | 6/1998 | Rud, Jr. et al. | |
| 5,798,462 A | 8/1998 | Briefer et al. | |
| 6,295,875 B1 | 10/2001 | Frick et al. | |
| 6,843,133 B2 | 1/2005 | Broden et al. | |
| 7,334,484 B2 | 2/2008 | Harasyn et al. | |
| 7,401,522 B2 | 7/2008 | Broden et al. | |
| 7,437,939 B1 | 10/2008 | Chakraborty et al. | |
| 7,454,975 B2 | 11/2008 | Louwagie et al. | |
| 7,503,220 B2 | 3/2009 | Sittler et al. | |
| 7,591,184 B2 | 9/2009 | Broden | |
| 7,918,134 B2 | 4/2011 | Hedtke et al. | |
| 2004/0105215 A1 | 6/2004 | Hegner et al. | |

OTHER PUBLICATIONS

Written Opinion and International Search Report, for PCT No. PCT/US2015/053220, dated Dec. 28, 2015, 11 pages.
International Preliminary Report on Patentability for PCT Application No. PCT/US2015/053220, dated Apr. 13, 2017, 7 Pages.

*Primary Examiner* — Tony Tran
(74) *Attorney, Agent, or Firm* — Kinney & Lange, P.A.

(57) ABSTRACT

A capacitance-based pressure sensor for measuring a process variable includes a metal sensor body, a diaphragm disposed within a cavity of the metal sensor to form a deflectable capacitor plate, and an insulator extending through the metal sensor body from an end wall to the cavity. The pressure sensor further includes an isolation tube in fluid connection with the cavity, the isolation tube extending into the insulator through the end wall, a stationary capacitor plate on a surface of the insulator in the cavity, the stationary capacitor plate spaced from the diaphragm, and an electrical lead wire connected to the stationary capacitor plate and extending through the insulator parallel to the isolation tube and exiting the insulator at the end wall. A fill fluid is within the isolation tube and the cavity to apply pressure to the diaphragm.

14 Claims, 3 Drawing Sheets

DIFFERENTIAL PRESSURE SENSOR WITH HIGH PRESSURE CAPABILITIES

BACKGROUND

The present invention relates to pressure sensors for use in industrial process transmitters, and in particular, to capacitance-based pressure sensors.

Capacitance-based pressure sensors are used to measure the pressure of process fluids in industrial process systems by generating electrical output in response to physical change. One such exemplary capacitance-based sensor is described in U.S. Pat. No. 6,295,875.

Oil and gas industries often use pressure sensors in extreme and harsh environments that subject the pressure sensors to high line pressures and high temperatures. There is a continuing need for pressure sensors that can operate in these extreme and harsh environments.

SUMMARY

A capacitance-based differential pressure sensor for measuring a process variable includes a first cell half and a second cell half. The first and second cell halves each include a metal body having an exterior end wall and an interior wall, an insulator that extends through the metal body to a surface at the interior wall, and a capacitor plate positioned on the insulator at the surface. The pressure sensor includes a diaphragm connected at a joint between the interior surfaces of the first cell half and second cell half. Each cell half includes an isolation tube with a first end in fluid communication with an interior cavity and extending through the insulator to exit the cell half at the exterior end wall. The pressure sensor additionally includes electrical lead wires with first ends in contact with the capacitor plates and extending through the insulators parallel to the isolation tubes to exit the cell halves at the exterior end walls. A third electrical lead wire with a first end is in contact with the first cell half or the second cell half. Each isolation tube and interior cavity of the cell halves contains a fill fluid.

A pressure sensor includes a cell body having a first exterior end wall, a second exterior end wall, a cylindrical side wall, a first interior wall, and a second interior wall, the first and second interior walls facing one another and defining an interior cavity, wherein the cell body includes a first metal cell half surrounding a first insulator region that extends from the first exterior end wall to the interior cavity and forms a first curved surface of the first interior wall, and a second metal cell half surrounding a second insulator region that extends from the second exterior end wall to the interior cavity and forms a second curved surface of the second interior wall. The pressure sensor includes a deflectable diaphragm connected at an outer periphery between the first and second interior walls, the diaphragm separating the interior cavity into a first cavity and a second cavity, a first electrode on the first curved surface, and a second electrode on the second curved surface. A first electrical lead extends from the first electrode through the first insulator region and out of the first exterior end wall, and a second electrical lead extends from the second electrode through the second insulator region and out of the second exterior end wall.

A capacitance-based pressure sensor for measuring a process variable includes a metal sensor body, a diaphragm disposed within a cavity of the metal sensor to form a deflectable capacitor plate, and an insulator extending through the metal sensor body from an end wall to the cavity. The pressure sensor further includes an isolation tube in fluid connection with the cavity, the isolation tube extending into the insulator through the end wall, a stationary capacitor plate on a surface of the insulator in the cavity, the stationary capacitor plate spaced from the diaphragm, and an electrical lead wire connected to the stationary capacitor plate and extending through the insulator parallel to the isolation tube and exiting the insulator at the end wall. A fill fluid is within the isolation tube and the cavity to apply pressure to the diaphragm.

DETAILED DESCRIPTION

In general, the present invention is a capacitance-based pressure sensor that uses a fixed capacitor plate and a flexible conductive diaphragm to generate a capacitance for measurement of process fluid differential pressure. A pressure sensor is designed with specific features that allow the pressure sensor to survive in the extreme and harsh environments that subject the pressure sensors to high line pressures and high temperatures. First, the size of the sensing areas that respond to pressure applied to the pressure sensor can be reduced. This reduces load forces on the pressure sensor, as the force increases with an increase in area. Second, the insulator is shaped so that it exits the pressure sensor only at a first end wall of a first cell half and a second end wall of a second cell half. This reduces the stresses put on the insulator so that the insulator does not crack under high pressure. Insulator cracking under high pressure needs to be avoided as it causes leak paths within the pressure sensor. Third, the pressure sensor is designed so that electrical lead wires exit the cell body parallel to an isolation tube. This allows the pressure sensor to withstand high line pressures and simplifies assembly of the pressure sensor.

Figure 1:
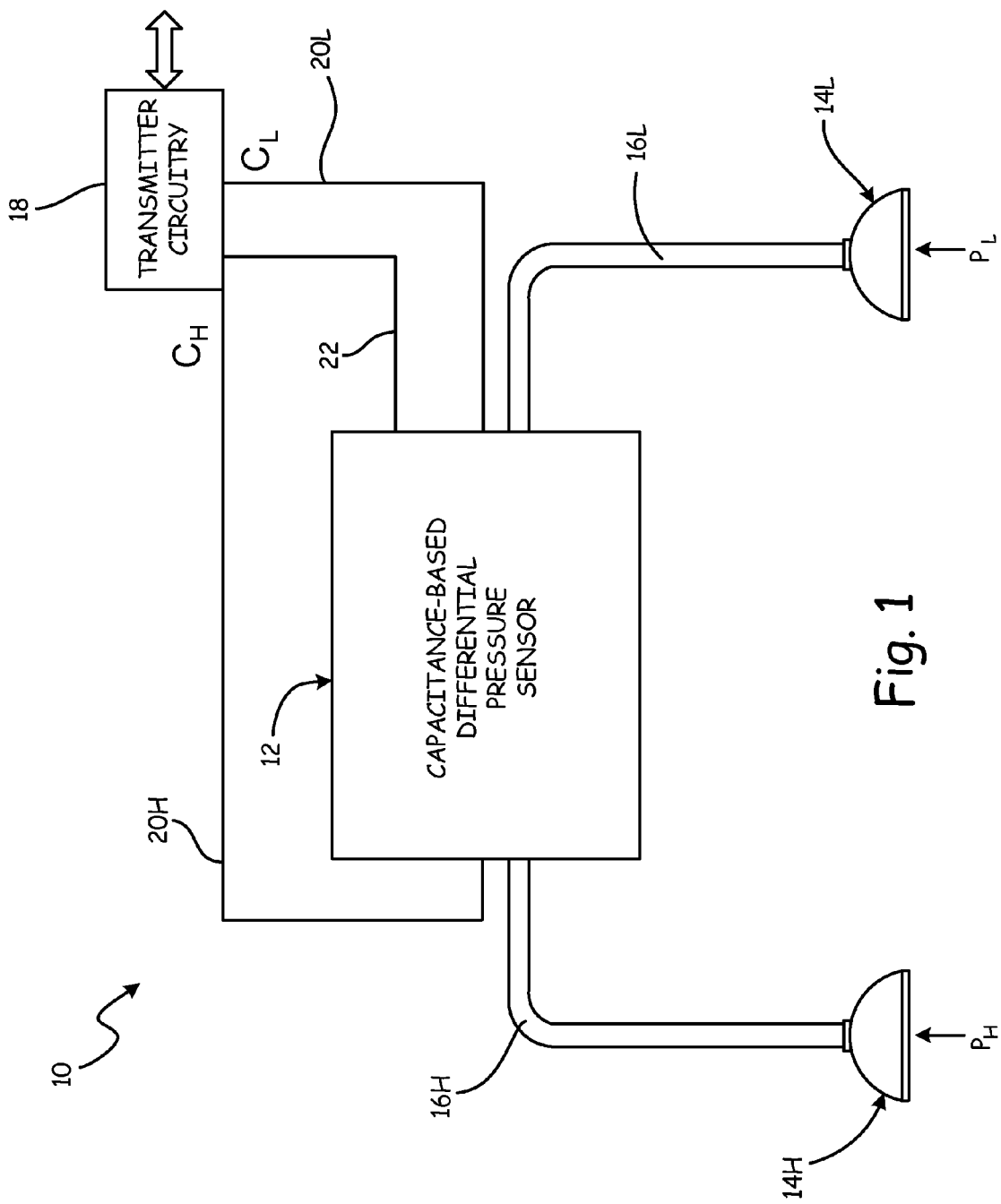
FIG. 1 is a schematic view of one embodiment of a system for measuring a process fluid pressure.

FIG. 1 is a schematic view of one embodiment of system 10, which includes capacitance-based differential pressure sensor 12, first isolation diaphragm 14H, second isolation diaphragm 14L, first isolation tube 16H, second isolation tube 16L, transmitter circuitry 18, first plate lead wire 20H, second plate lead wire 20L, and diaphragm lead wire 22. Also shown in FIG. 1 is pressure $P_H$ and pressure $P_L$ of the process fluid that is in contact with isolation diaphragms 14H and 14L, respectively.

In this embodiment, capacitance-based differential pressure sensor 12 is connected to first isolation diaphragm 14H with first isolation tube 16H. First isolation tube 16H has a first end in fluid communication with capacitance-based differential pressure sensor 12 and a second end in communication with first isolation diaphragm 14H. First isolation diaphragm 14H can be deflected in response to pressure $P_H$ applied to first isolation diaphragm 14H via the process fluid. Pressure $P_H$ from the process fluid is transmitted to a first fill fluid in first isolation tube 16H due to the deflection of first isolation diaphragm 14H. Pressure $P_H$ is communicated by the first fill fluid through first isolation tube 16H to capacitance-based differential pressure sensor 12.

Capacitance-based differential pressure sensor 12 is connected to second isolation diaphragm 14L with second isolation tube 16L. Second isolation tube 16L has a first end in fluid communication with capacitance-based differential pressure sensor 12 and a second end in communication with second isolation diaphragm 14L. Second isolation diaphragm 14L is also in contact with the process fluid. Second isolation diaphragm 14L can be deflected in response to pressure $P_L$ applied to second isolation diaphragm 14L via the process fluid. Pressure $P_L$ from the process fluid is transmitted to a second fill fluid in second isolation tube 16L due to the deflection of second isolation diaphragm 14L. Pressure $P_L$ is communicated by the second fill fluid through second isolation tube 16L to capacitance-based differential pressure sensor 12.

Capacitance-based differential pressure sensor 12 is connected to transmitter circuitry 18 by first plate lead wire 20H, second plate lead wire 20L, and diaphragm lead wire 22. First plate lead wire 20H has a first end connected to capacitance-based pressure sensor 12 and a second end connected to transmitter circuitry 18. Second plate lead wire 20L has a first end connected to capacitance-based pressure sensor 12 and a second end connect to transmitter circuitry 18. Diaphragm lead wire 22 has a first end connected to capacitance-based differential pressure sensor 12 and a second end connected to transmitter circuitry 18.

Capacitance-based differential pressure sensor 12 produces electronic signals in response to a pressure difference between pressure $P_H$ from the process fluid and pressure $P_L$ from the process fluid. First plate lead wire 20H, second plate lead wire 20L, and diaphragm lead wire 22 communicate electrical signals from capacitance based differential pressure sensor 12 to transmitter circuitry 18. Transmitter circuitry 18 uses the electrical signals to generate a differential pressure measurement.

Figure 2:
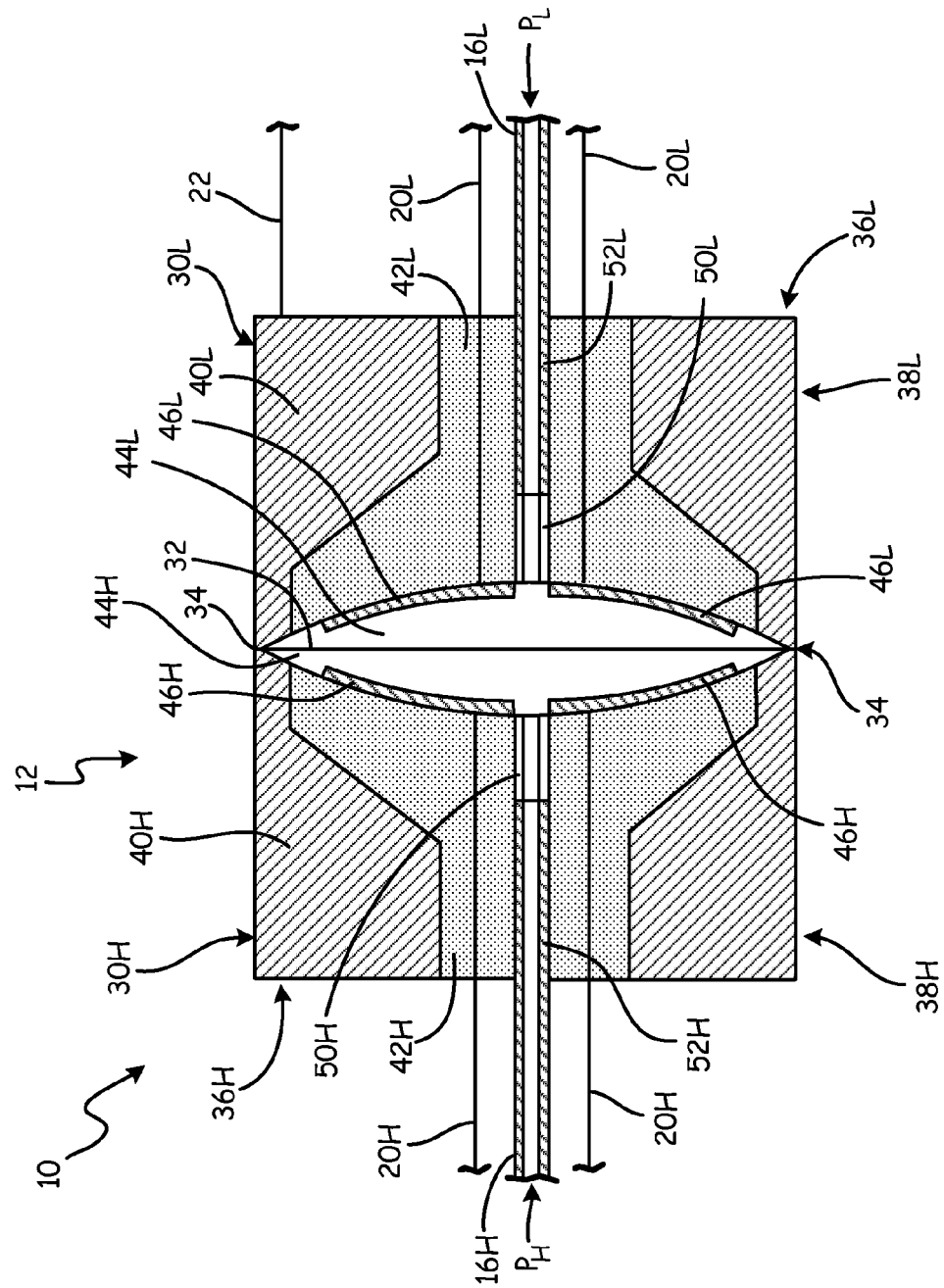
FIG. 2 is a cross-sectional break-away view of one embodiment of a capacitance-based differential pressure sensor in the system seen in FIG. 1.

FIG. 2 is a cross-sectional break-away view of one embodiment of capacitance-based differential pressure sensor 12 in system 10. System 10 includes capacitance-based differential pressure sensor 12, first isolation tube 16H, second isolation tube 16L, first plate lead wires 20H, second plate lead wires 20L, and diaphragm lead wire 22. Capacitance-based differential pressure sensor 12 includes first cell half 30H, second cell half 30L, diaphragm 32, joint 34, first end wall 36H, second end wall 36L, sidewall 38H, and sidewall 38L. First cell half 30H includes first metal body half 40H, first insulator 42H, first interior cavity 44H, and first capacitor plate 46H. Second cell half 30L includes second metal body half 40L, second insulator 42L, second interior cavity 44L, and second capacitor plate 46L. First isolation tube 16H further includes first portion 50H and second portion 52H. Second isolation tube 16L further includes first portion 50L and second portion 52L.

First isolation tube 16H and second isolation tube 16L are in fluid communication with capacitance-based pressure sensor 12. First plate lead wires 20H, second plate lead wires 20L, and diaphragm lead wire 22 are in electrical contact with capacitance-based pressure sensor 12. In the embodiment shown in FIGS. 2, 3A, and 3B, system 10 includes five electrical lead wires, including two first plate lead wires 20H, two second plate lead wires 20L, and one diaphragm lead wire 22. In other embodiments, system 10 includes three electrical lead wires, including one first plate lead wire 20H, one second plate lead wire 20L, and one diaphragm lead wire 22, as is shown in FIG. 1. Other alternative lead wire arrangements are also possible.

Capacitance-based differential pressure sensor 12 includes first cell half 30H and second cell half 30L that are welded together to form a body portion of capacitance-based pressure sensor 12. First cell half 30H and second cell half 30L are cylindrical shaped. Diaphragm 32 is positioned between first cell half 30H and second cell half 30L and welded at joint 34. The weld at joint 34 seals first cell half 30H and second cell half 30L together and holds diaphragm 32 under a tension that enables it to bend when subjected to a pressure difference between pressures $P_H$ and $P_L$. Diaphragm 32 may also be referred to as a flexible capacitor plate, flexible electrode plate, sensing diaphragm, central diaphragm, or membrane. First end wall 36H forms one end of first cell half 30H. Second end wall 36L forms one end of second cell half 30L. Sidewall 38H and sidewall 38L form outer walls of the cylindrical body portions of first cell half 30H and second cell half 30L, respectively.

First and second cell halves 30H and 30L of capacitance-based differential pressure sensor 12 include first and second metal body halves 40H and 40L, first and second insulators 42H and 42L, first and second interior cavities 44H and 44L, and first and second capacitor plates 46H and 46L, respectively. First and second metal body halves 40H and 40L are annular and surround first and second insulators 42H and 42L, which are fused to first and second metal body halves 40H and 40L, respectively. First and second insulators 42H and 42L are made of glass or ceramic-based material. First and second cell halves 30H and 30L each have a recess on one side that forms first and second interior cavities 44H and 44L, respectively. First and second interior cavities 44H and 44L extend at least across first and second insulators 42H and 42L to form interior walls between first and second insulators 42H and 42L and first and second interior cavities 44H and 44L, respectively. First and second capacitor plates 46H and 46L are positioned in first and second interior cavities 44H and 44L, respectively. First and second capacitor plates 46H and 46L are preferably O-shaped and are connected to the interior walls between first and second insulators 42H and 42L and first and second interior cavities 44H and 44L, respectively. First and second metal body halves 40H and 40L are electrically conductive. Metal body halves make up cell bodies that can withstand higher temperatures and higher pressure environments than weaker non-metal cell bodies.

First and second isolation tubes 16H and 16L and first and second plate lead wires 20H and 20L extend through first and second cell halves 30H and 30L, respectively. First and second isolation tubes 16H and 16L have first ends in fluid communication with first and second interior cavities 44H and 44L and extend through first and second insulators 42H and 42L to exit first and second cell halves 30H and 30L at first and second end walls 36H and 36L, respectively. First and second fill fluids are contained in first and second isolation tubes 16H and 16L and first and second interior cavities 44H and 44L, respectively. First ends of first and second isolation tubes 16H and 16L include first sections 50H and 50L, respectively. First sections 50H and 50L are made of insulating material, such as glass or ceramic-based material. First sections 50H and 50L of first and second isolation tubes 16H and 16L prevent first and second isolation tubes 16H and 16L from contacting the metallic first and second capacitor plates 36H and 36L and disrupting capacitance measurement. First and second isolation tubes 16H and 16L also include second sections 52H and 52L that are made of a metallic material. First and second plate lead wires 20H and 20L each have first ends in contact with first and second capacitor plates 46H and 46L and extend through first and second insulators 42H and 42L in a position parallel to first and second isolation tubes 16H and 16L to exit first and second cell halves 30H and 30L at first and second end walls 36H and 36L, respectively. First and second insulators 42H and 42L prevent first and second isolation tubes 16H and 16L and first and second plate lead wires 20H and 20L from contacting first and second metal body halves 40H and 40L and disrupting capacitance measurement.

Capacitance-based differential pressure sensor 12 produces two capacities $C_H$ and $C_L$ that can be used to generate a differential pressure measurement. The first process fluid pressure is communicated by the first fill fluid through first isolation tube 16H to reach first interior cavity 44H to influence the position of diaphragm 32. The second process fluid pressure is communicated by the second fill fluid through second isolation tube 16L to reach second interior cavity 44L to influence the position of diaphragm 32. Diaphragm 32 is in contact with first metal body half 40H and second metal body half 40L at joint 34. Diaphragm 32 will be deflected depending on the difference in pressure $P_H$ the first fill fluid in cavity 44H and pressure $P_L$ of the second fill fluid in cavity 44L. Capacitance $C_H$ is a function of the distance between diaphragm 32 and fixed first capacitor plate 46H in first interior cavity 44H. Capacitance $C_H$ appears between wires 20H and wire 22. Capacitance $C_L$ is a function of distance between diaphragm 32 and fixed second capacitor plate 46L. Capacitance $C_L$ appears between wires 20L and wire 22. Wires 20H, 20L, and 22 are connected to transmitter circuitry 18 (FIG. 1), which includes circuitry, such as a sigma delta capacitance-to-digital (C/D) converter, that produces digital data based on capacitances $C_H$ and $C_L$.

First insulator 42H allows for first isolation tube 16H and first plate lead wires 20H to travel through conductive first metal body half 40H of first cell half 30H without interfering with capacitance $C_H$. Likewise, second insulator 42L allows second isolation tube 16L and second plate lead wires 20L to travel through conductive second metal body half 40L of second cell half 30L without interfering with capacitance $C_L$. First isolation tube 16H and first plate lead wires 20H travel through first insulator 42H and exit first cell half 30H in parallel. Second isolation tube 16L and second plate lead wires 20L travel through second insulator 42L and exit second cell half 30L in parallel.

The parallel arrangement of isolation tubes 16H and 16L and plate lead wires 20H and 20L within cell halves 30H and 30L makes it possible for metal body halves 40H and 40L to have an annular shape that surrounds insulators 42H and 42L. This allows insulators 42H and 42L to only exit cell halves 30H and 30L at first end wall 36H and second end wall 36L, as insulators 42H and 42L do not extend to sidewalls 38H or 38L of cell halves 30H and 30L. As a result, plate lead wires 20H and 20L are located in the largely compressive stress fields of insulators 42H and 42L and metal body halves 40H and 40L extend the entire length of sidewalls 42H and 42L. This allows capacitance-based differential pressure sensor 12 to withstand increased line pressures and higher operating temperatures. Alternatively, under the same line pressure, the diameter of capacitance-based differential pressure sensor 12 may be reduced compared to prior art capacitance-based differential pressure sensors. The parallel configuration also increases the distance between plate lead wires 20H and 20L and weld joint 34, which reduces the possibility of thermal shock during the welding process. Additionally, the arrangement increases the distance between plate lead wires 20H and 20L, reducing stray capacitance.

Figure 3A:
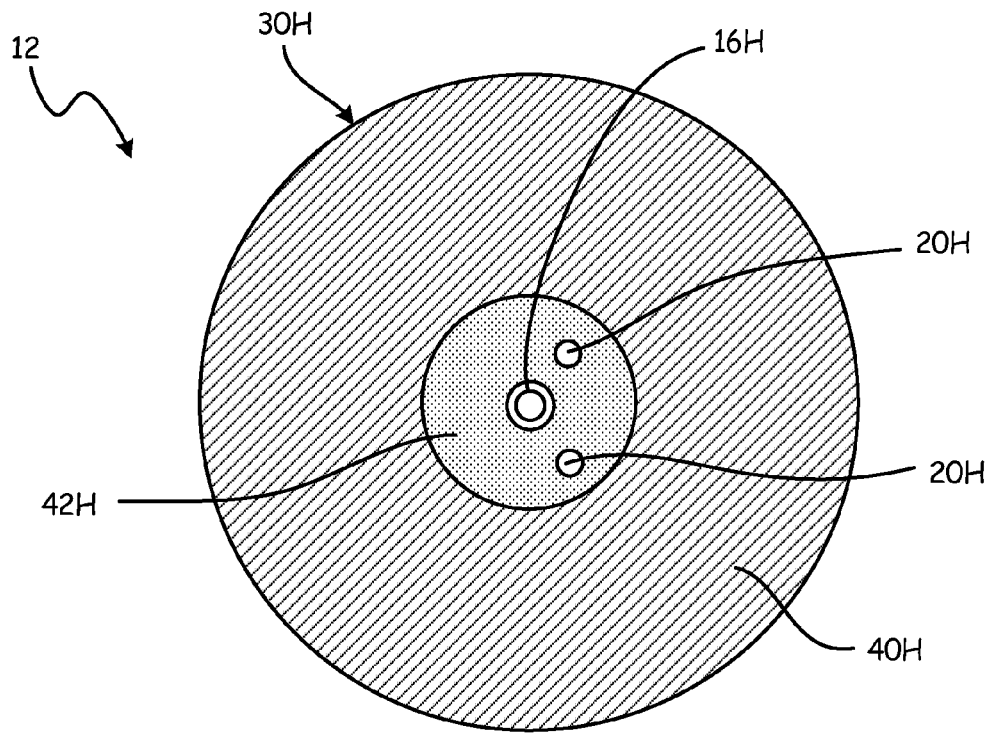
FIG. 3A is an end view of the capacitance-based differential pressure sensor of FIG. 2 illustrating exit points of an isolation tube and electrical lead wires.

FIG. 3A is an end view of one embodiment of a capacitance-based differential pressure sensor 12 of FIG. 2 illustrating exit points of first isolation tube 16H and first plate lead wires 20H from first cell half 30H. FIG. 3A includes capacitance-based differential pressure sensor 12, first isolation tube 16H, and first plate lead wires 20H. Capacitance-based differential pressure sensor 12 includes first cell half 30H, including first metal body half 40H and first insulator 42H. In this embodiment, capacitance-based differential pressure sensor 12 has a second cell half in which a second isolation tube and second plate lead wires exit second cell half through a second insulator in the same configuration, respectively.

First metal body half 40H of first cell half 30H is annular and surrounds first insulator 42H, which is fused to first metal body half 40H. First isolation tube 16H and first plate lead wires 20H exit first cell half 30H through first insulator 42H in a parallel configuration. First insulator 42H allows first isolation tube 16H and first plate lead wires 20H to travel through conductive first metal body half 40H of first cell half 30H without interfering with capacitance. In this embodiment, first isolation tube 16H travels and exits through the center of first insulator 42H. First plate lead wires 20H travel and exit through first insulator 42H in positions equidistant from first isolation tube 16H and first metal body half 40H. Additionally, first isolation tube 16H and first plate lead wires 20H are arranged in a triangular pattern in relation to one another.

Figure 3B:
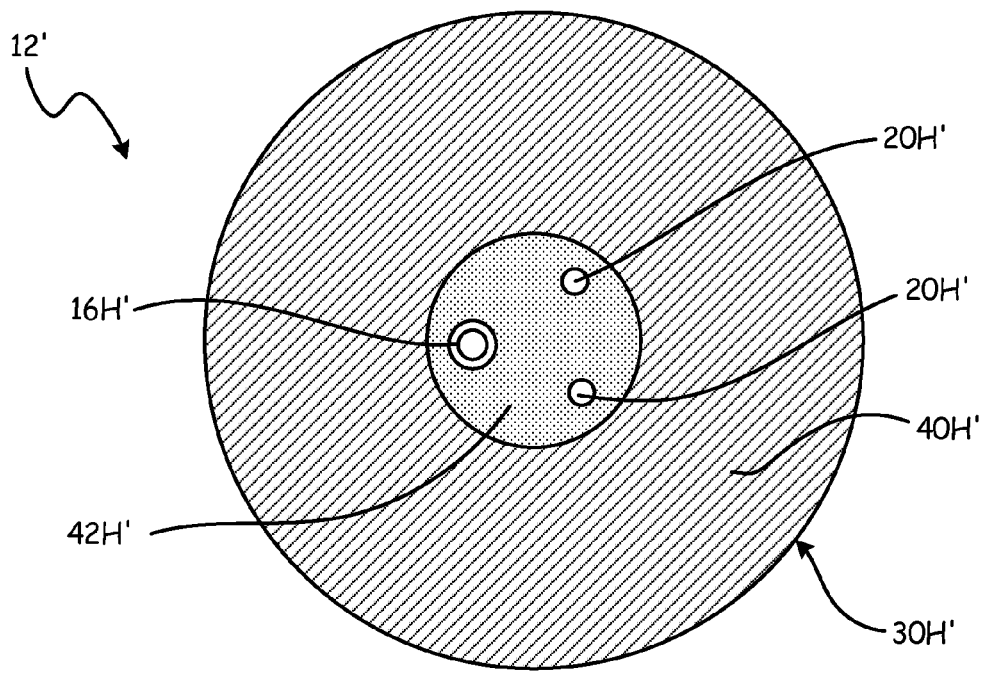
FIG. 3B is an end view of the capacitance-based differential pressure sensor of FIG. 2 illustrating an alternate embodiment of exit points of the isolation tube and electrical lead wires.

FIG. 3B is an end view of capacitance-based differential pressure sensor 12' of FIG. 2 illustrating an alternate embodiment of exit points of first isolation tube 16H' and first plate lead wires 20H' from first cell half 30H'. FIG. 3B includes capacitance-based differential pressure sensor 12', first isolation tube 16H', and first plate lead wires 20H'. Capacitance-based differential pressure sensor includes first cell half 30H', including first metal body half 40H' and first insulator 42H'. In this embodiment, capacitance-based differential pressure sensor 12' has a second cell half, in which a second isolation tube and second plate lead wires exit second cell half through a second insulator in the same configuration, respectively.

First metal body half 40H' of first cell half 30H' is annular and surrounds first insulator 42H', which is fused to first metal body half 40H'. First isolation tube 16H' and first plate lead wires 20H' exit first cell half 30H' through first insulator 42H' in a parallel configuration. First insulator 42H' provides a means for first isolation tube 16H' and first plate lead wires 20H' to travel through conductive first metal body half 40H' of first cell half 30H' without interfering with capacitance. In this embodiment, first isolation tube 16H' travels and exits through first insulator 42H' adjacent to an outer surface of first insulator 42H'. First plate lead wires 20H' travel and exit through first insulator 42H' adjacent to an outer surface of first insulator 42H' equidistant from first isolation tube 16H' in a triangular pattern.

In an alternate embodiment, first and second cell halves 30H and 30L may include a second ring-shaped capacitor plate positioned in first and second interior cavities 44H and 44L and connected to the recessed surface of first and second insulators 42H and 42L radially outward from and not in contact with first and second capacitor plates 46H and 46L, respectively, as described in U.S. Pat. No. 6,295,875. Additional plate lead wires have first ends in contact with the ring-shaped capacitor plates and extend through first and second insulators 42H and 42L in a position parallel to first and second isolation tubes 16H and 16L and first and second plate lead wires 20H and 20L to exit first and second cell halves 30H and 30L, respectively. The second ends of the additional electrical lead wires are connected to transmitter circuitry 18 to provide additional compensation capacities used in conjunction with $C_H$ and $C_L$ to assist in compensating for diaphragm deformation, particularly at high pressures, thereby rendering a more accurate pressure measurement.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A capacitance-based differential pressure sensor for measuring a process variable, the pressure sensor comprising:
    a first cell half comprising:
        a first metal body having a planar first exterior end wall, a first interior wall, and a cylindrical side wall perpendicular to the first exterior end wall;
        a first insulator that extends from a central portion of the first exterior end wall through the first metal body to a first surface at the first interior wall without extending to the cylindrical side wall; and
        a first capacitor plate positioned on the first insulator at the first surface;
    a second cell half comprising:
        a second metal body having a planar second exterior end wall, a second interior wall, and a cylindrical side wall perpendicular to the second exterior end wall;
        a second insulator that extends from a central portion of the second exterior end wall through the second metal body to a second surface at the second interior wall without extending to the cylindrical side wall; and
        a second capacitor plate positioned on the second insulator at the second surface;
    a diaphragm connected at a joint between the first interior surface of the first cell half and the second interior surface of the second cell half;
    a first isolation tube with a first end in fluid communication with a first interior cavity and extending through the first insulator to exit the first cell half at the first exterior end wall;
    a second isolation tube with a first end in fluid communication with a second interior cavity and extending through the second insulator to exit the second cell half at the second exterior end wall;
    a first electrical lead wire with a first end in contact with the first capacitor plate and extending through the first insulator parallel to the first isolation tube to exit the first cell half parallel to the first isolation tube at the first exterior end wall;
    a second electrical lead wire with a first end in contact with the second capacitor plate and extending through the second insulator parallel to the second isolation tube to exit the second cell half parallel to the second isolation tube at the second exterior end wall;
    a third electrical lead wire with a first end in contact with the first cell half or the second cell half;
    a first fill fluid within the first isolation tube and the first interior cavity; and
    a second fill fluid within the second isolation tube and the second interior cavity,
    wherein at a point where the first isolation tube and the first electrical lead wire exit the first cell half they are substantially perpendicular to the first exterior end wall, and at a point where the second isolation tube and the second electrical lead wire exit the second cell half they are substantially perpendicular to the second exterior end wall.

2. The pressure sensor of claim 1, wherein the diaphragm is electrically connected through one of the first and second metal bodies to the third electrical lead wire.

3. The pressure sensor of claim 1, including a plurality of first electrical lead wires, and a plurality of second electrical lead wires.

4. The pressure sensor of claim 1, wherein the first isolation tube includes a second end that terminates adjacent a first isolation diaphragm, and wherein the second isolation tube includes a second end that terminates adjacent a second isolation diaphragm.

5. The pressure sensor of claim 1, wherein the first electrical lead wire, the second electrical lead wire, and the third electrical lead wire each have a second end connected to circuitry to produce a differential pressure signal output.

6. The pressure sensor of claim 1, wherein the first metal body is annular and surrounds the first insulator, and wherein the second metal body is annular and surrounds the second insulator.

7. The pressure sensor of claim 1, wherein the insulator is a glass or ceramic-based material.

8. The pressure sensor of claim 1, wherein the first and second surfaces of the first and second interior walls, respectively, are curved surfaces.

9. A pressure sensor comprising:
    a cell body having a planar first exterior end wall, a planar second exterior end wall, a cylindrical side wall perpendicular to the first exterior end wall and the second exterior end wall, a first interior wall, and a second interior wall, the first and second interior walls facing one another and defining an interior cavity, wherein the cell body includes a first metal cell half surrounding a first insulator region that extends from a central portion of the first exterior end wall to the interior cavity without extending to the cylindrical side wall and forms a first surface of the first interior wall, and a second metal cell half surrounding a second insulator region that extends from a central portion of the second exterior end wall to the interior cavity without extending to the cylindrical side wall and forms a second surface of the second interior wall;
    a deflectable diaphragm connected at an outer periphery between the first and second interior walls, the diaphragm separating the interior cavity into a first cavity and a second cavity;
    a first fluid passage extending through the first insulator region from the first cavity to the first exterior end wall;
    a second fluid passage extending through the second insulator region from the second cavity to the second exterior end wall;
    a first electrode on the first surface;
    a second electrode on the second surface;

a first electrical lead extending from the first electrode through the first insulator region parallel to the first fluid passage and out of the first exterior end wall; and a second electrical lead extending from the second electrode through the second insulator region parallel to the second fluid passage and out of the second exterior end wall;

wherein at a point where the first fluid passage and the first electrical lead exit the first metal cell half they are substantially perpendicular to the first exterior end wall, and at a point where the second fluid passage and the second electrical lead exit the second metal cell half they are substantially perpendicular to the second exterior end wall.

10. The pressure sensor of claim 9, including a plurality of first electrical lead wires, and a plurality of second electrical lead wires.

11. The pressure sensor of claim 9, wherein the first surface of the first interior wall and the second surface of the second interior wall are curved surfaces.

12. The pressure sensor of claim 9, and further comprising:

a third electrical lead wire with a first end in contact with the first metal cell half or the second metal cell half, wherein the deflectable diaphragm is electrically connected through one of the first metal cell half and the second metal cell half to the third electrical lead wire.

13. The pressure sensor of claim 12, wherein the first electrical lead wire, the second electrical lead wire, and the third electrical lead wire each have a second end connected to circuitry to produce a pressure signal output.

14. The pressure sensor of claim 9, wherein the insulator is a glass or ceramic-based material.

\* \* \* \* \*